United States Patent [19]
Herzog

[11] Patent Number: 6,092,643
[45] Date of Patent: Jul. 25, 2000

[54] METHOD AND APPARATUS FOR DETERMINING STALLING OF A PROCESSION OF MOVING ARTICLES

[76] Inventor: Kenneth Herzog, Kaps-All Packaging Systems, 200 Mill Rd., Riverhead, N.Y. 11901-3125

[21] Appl. No.: 08/971,440

[22] Filed: Nov. 17, 1997

Related U.S. Application Data

[63] Continuation-in-part of application No. 08/966,305, Nov. 7, 1997.

[51] Int. Cl.⁷ .................................................. B65G 47/26
[52] U.S. Cl. ........................................ 198/444; 198/460.1
[58] Field of Search ............................ 198/460.1, 460.2, 198/464.1, 464.2, 464.4, 502.1, 572, 444, 347.3

[56] References Cited

U.S. PATENT DOCUMENTS

| | | |
|---|---|---|
| 3,822,009 | 7/1974 | Richards .................................. 198/444 |
| 3,946,349 | 3/1976 | Haldeman, III . |
| 4,711,336 | 12/1987 | Mattei .................................... 198/347.3 |
| 4,898,271 | 2/1990 | Schiessl ........................... 198/460.1 X |
| 4,989,718 | 2/1991 | Steeber .................................. 198/347.3 |
| 5,082,103 | 1/1992 | Ross et al. ............................ 198/460.1 |
| 5,097,939 | 3/1992 | Shanklin et al. .................. 198/460.1 X |
| 5,101,086 | 3/1992 | Dion et al. .......................... 219/10.491 |
| 5,381,913 | 1/1995 | Peeters . |
| 5,461,215 | 10/1995 | Haldeman . |
| 5,523,546 | 6/1996 | Lake . |

FOREIGN PATENT DOCUMENTS

| | | |
|---|---|---|
| 0408230 | 1/1991 | European Pat. Off. . |
| 4213830 | 11/1993 | Germany . |
| 9722523 | 6/1997 | WIPO . |

OTHER PUBLICATIONS

Search Report Issued by the European Patent Office on Apr. 14, 1998 in the Corresponding European Application.

Product Brochure, Pillar Foiler Capsealing System, Pillar Technologies Ltd. Partnership.

Product Brochure, Lepel Cap Sealing, Product Selection Guide.

Coil Design Holds Key To Improving Induction Cap Sealing Efficiency, Ronald F. May, Journal of Packaging Technology Jan./Feb. 1991.

*Primary Examiner*—James R. Bidwell
*Attorney, Agent, or Firm*—Ostrolenk, Faber, Gerb & Soffen, LLP

[57] ABSTRACT

Apparatus for determining whether the movement of articles travelling on a conveyor have stalled includes a first sensor, such as a photoeye, for sensing the presence of at least one of the articles at a first location along the conveyor and second sensor, such as a photoeye, for sensing whether the articles are moving past another location along the conveyor. A control unit is provided which is responsive to the first photoeye sensing the presence of at least one article at the first location and responsive to the second photoeye detecting that articles are not moving for determining that the movement of the articles has stalled and for initiating appropriate corrective action, such as actuating alarm(s) and, in the case where the apparatus is used in conjunction with an induction sealing apparatus, terminating power to the sealing head of such apparatus.

27 Claims, 8 Drawing Sheets

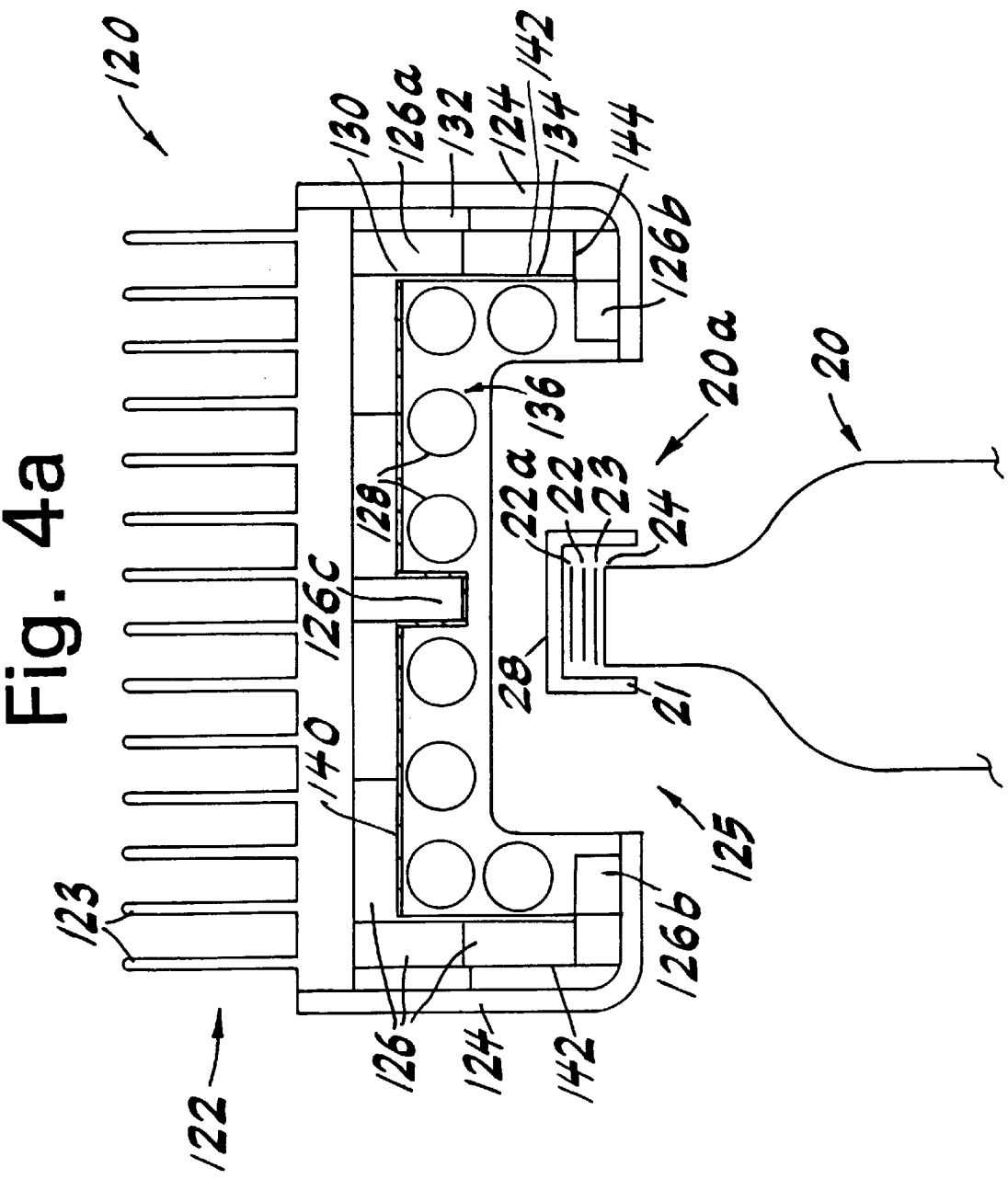

METHOD AND APPARATUS FOR DETERMINING STALLING OF A PROCESSION OF MOVING ARTICLES

CROSS-REFERENCE TO RELATED APPLICATIONS

This application is a Continuation-In-Part of application Ser. No. 08/966,305, filed Nov. 7, 1997, entitled INDUCTION FOIL CAP SEALER, the entire disclosure of which is incorporated by reference herein.

BACKGROUND OF THE INVENTION

1. Field of the Invention

The present invention relates to a method and apparatus for determining stalling of a procession of moving articles and, more particularly, to such a method and apparatus used in an induction sealing apparatus which seals a foil sheet or liner to the opening of a container.

2. Related Art

Induction sealing units for sealing, hermetically sealing or tamper-proof sealing a container with a foil liner are typically included in conveyor systems for high volume applications. These systems usually have flat or tunnel sealing heads mounted above a conveyor, which conveyor carries a plurality of containers to be sealed into proximity with the sealing head.

The containers to be sealed are preconditioned to include a foil liner disposed over the opening of the container. Usually, the foil liner is held in place by a screw-on or snap-on cap as is known in the art. Once the preconditioned container is brought within a predetermined distance from the sealing head, a coil within the sealing head produces an electromagnetic field near the foil liner which is disposed within the cap. The electromagnetic flux produced by the field causes current to flow in the foil liner which causes the foil liner to heat and melt the lip of the container (and wax compound if used). The molten plastic adheres the foil liner to the opening of the container and, when the plastic cools, a seal is produced. The downward force supplied by the cap ensures a proper bond between the foil liner and the opening of the container, particularly when the molten plastic is cooling.

Typically, the containers are moved past the sealing head in a continuous fashion. The timing of the movement of articles past the sealing head is such as to assure sufficient heating to effect sealing but not so long as to cause overheating which could damage the containers, the product therein, or cause a fire. Accordingly, it is necessary to assure that the containers move past the sealing head at the predetermined rate and to set off an alarm and/or disable the power to the sealing head if the movement of the procession of articles stalls for any reason.

SUMMARY OF THE INVENTION

Accordingly, it is an object of the present invention to provide a method and apparatus for determining whether a procession of moving articles has stalled.

Another object is to provide such a method and apparatus which is used in an induction foil cap sealer.

The foregoing and other objects of the invention are achieved in accordance with one aspect of the invention by an apparatus for determining whether a procession of moving articles has stalled, which apparatus includes first sensing means for sensing the presence of at least one of the plurality of articles at a first location along a path of travel of the articles; second sensing means for sensing whether articles are moving past a second location along the path; and means responsive to the first sensing means for sensing the presence of at least one article at the first location and to the second sensing for sensing that articles are not moving past the second location for determining that the movement of the articles have stalled.

According to another aspect of the invention, a method for determining whether a procession of moving articles has stalled includes the steps of sensing the presence of at least one of the articles at a first location along a path of travel of the articles; sensing whether articles are moving past another location along the path; and determining that the movement of articles has stalled if the presence of at least one article is sensed at the first location and no movement is sensed of articles past the second location.

Other features and advantages of the present invention will become apparent from the following description of the invention which refers to the accompanying drawings.

BRIEF DESCRIPTION OF THE DRAWING

For the purpose of illustrating the invention, there are shown in the drawing embodiments which are presently preferred, it being understood, however, that the invention is not limited to the precise arrangements and instrumentalities shown.

FIG. 4a is a side elevational view of a sealing head employed in the induction sealing unit of FIG. 2, in proximity to a container to be sealed, which embodies certain properties of the present invention.

DETAILED DESCRIPTION OF PREFERRED EMBODIMENT

Figure 1:
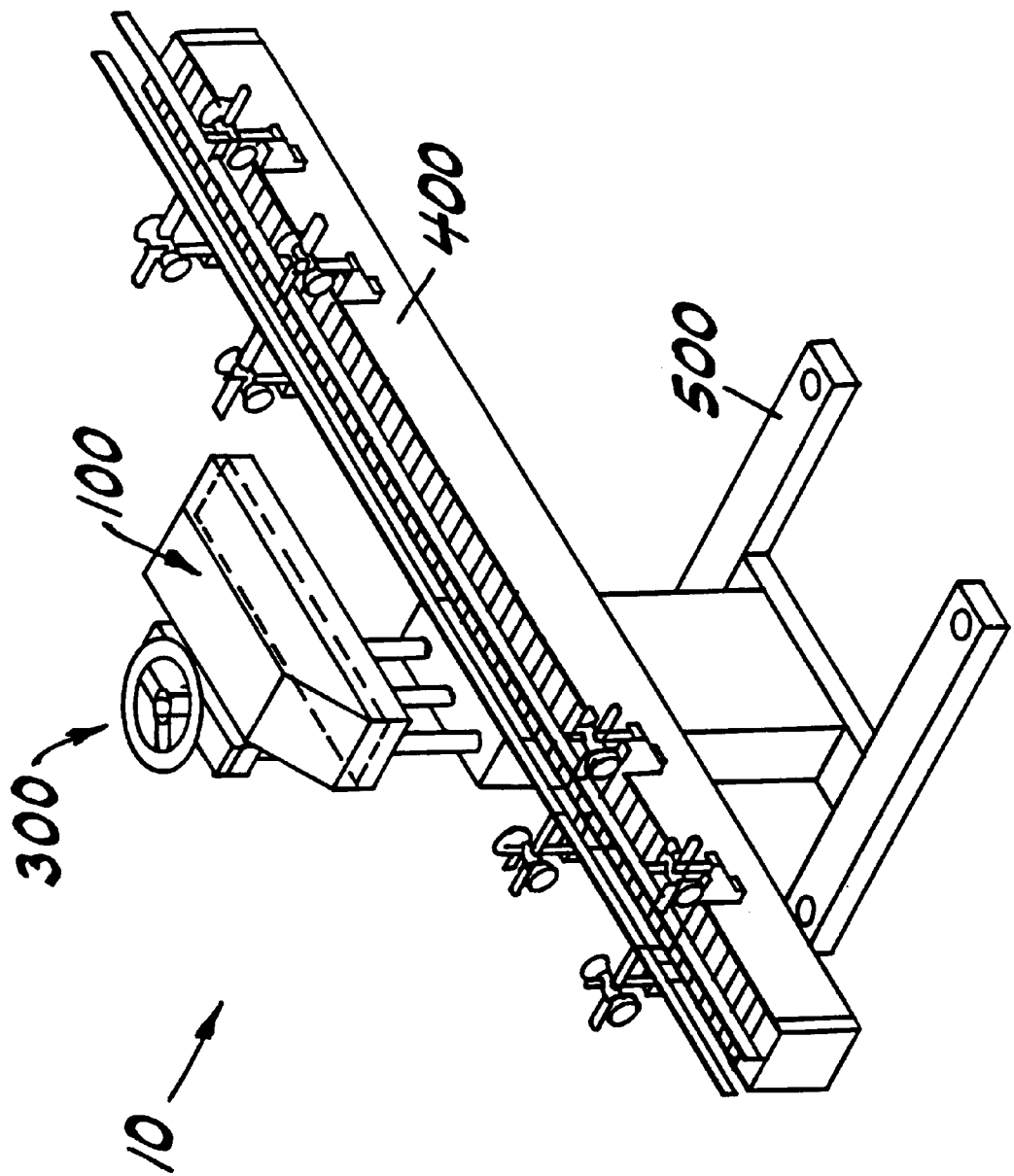
FIG. 1 shows a perspective view of an induction sealing conveyor system embodying certain principles of the present invention.

Referring now to the drawings wherein like numerals indicate like elements, there is shown in FIG. 1 an induction sealing conveyor system 10. The induction sealing conveyor system 10 includes an induction sealing unit 100, an adjustment mechanism 300, a conveyor 400, and a base 500. The adjustment mechanism 300 adjustably couples the induction sealing unit 100 to the base 500. Thus, the induction sealing unit 100 may be raised or lowered with respect to the base 500 and the conveyor 400 for insuring that the induction sealing unit is the proper distance from a container (not shown) to be sealed which travels down the conveyor 400. The adjustment mechanism 300 and the conveyor 400 are well-known in the art and any of the known adjustment mechanisms and conveyors can be used with the induction sealing unit 100 of the present invention.

Figure 2:
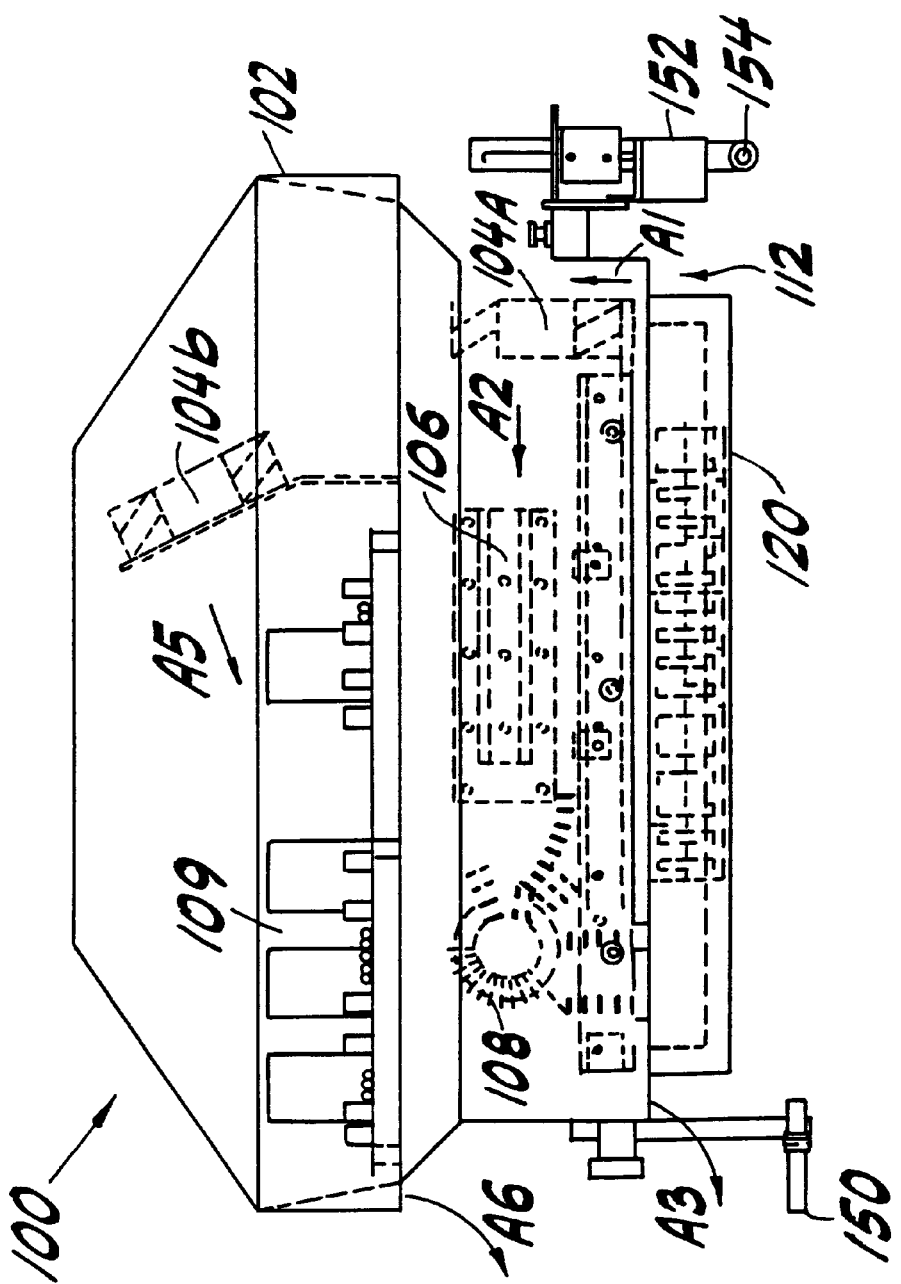
FIG. 2 is an elevational view of an induction sealing unit embodying certain principles of the present invention.
Figure 3:
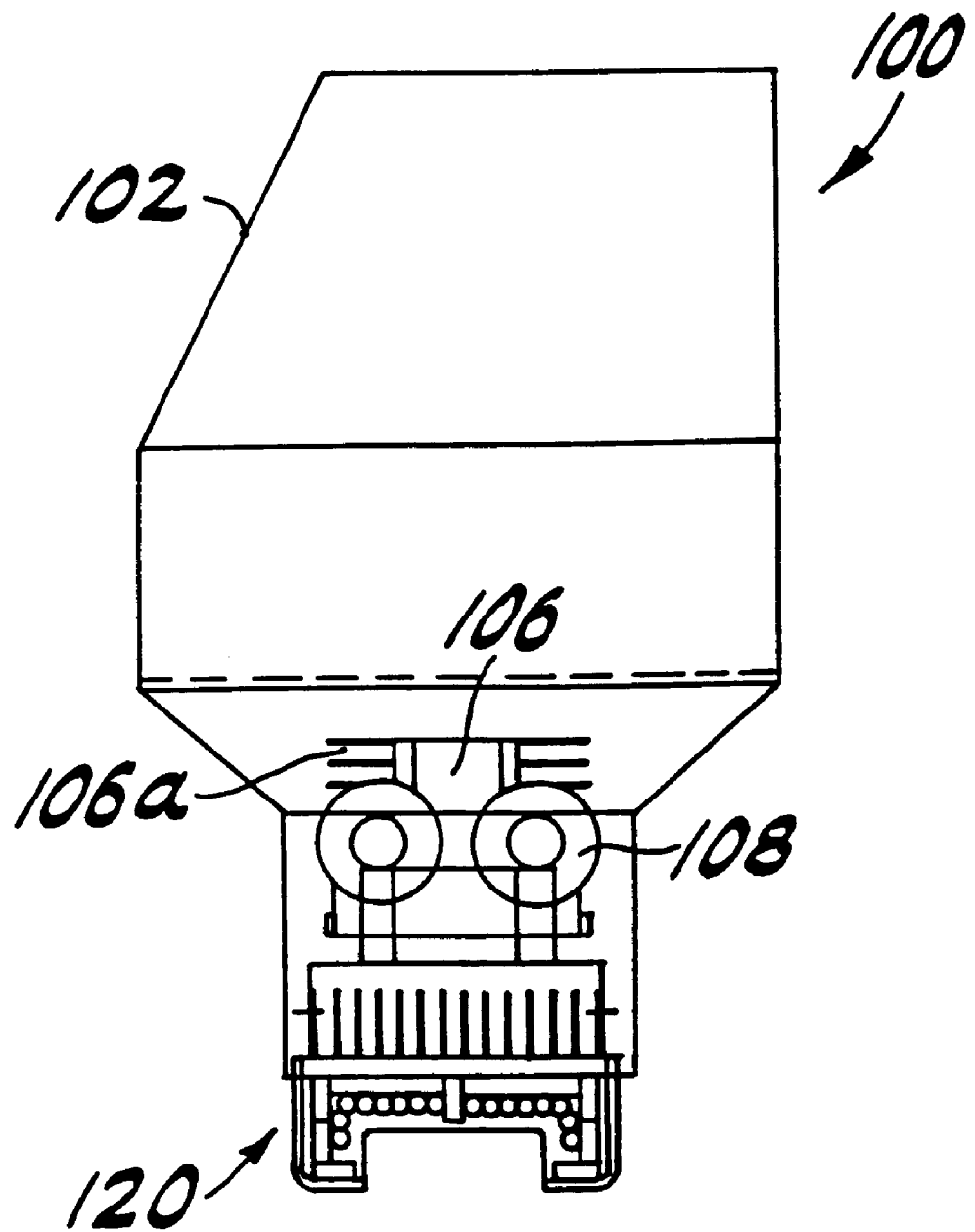
FIG. 3 is a side elevational view of a sealing head employed in the induction sealing unit of FIG. 2 which embodies certain principles of the present invention.

With reference to FIGS. 2 and 3, the induction sealing unit comprises a housing 102, a lower fan 104a, an upper fan 104b, a capacitor 106, a transformer 108, a sealing head 120 and a power supply (not shown). The sealing head 120 extends from the bottom of the housing 102.

With reference to FIG. 4a, the sealing head 120 is adapted to receive at least a portion of a container 20, preferably a top portion 20a. As shown, the top portion 20a includes a lip 24 forming an opening in the container 20, a foil liner 23, a wax compound 22, a paperboard portion 22a, and a cap 21. It is preferred, however, that the top portion of the container 20a only include the lip 24 and the foil liner 23 disposed in the cap 21.

The induction sealing unit 100 seals the container 20 by sealing the foil liner 23 to the lip 24 of the container. In use, the cap 21 including the foil liner 23 is screwed on the container 20 or attached to the container 20 by any of the known methods. The top portion 20a of the container 20 is then brought into proximity with the sealing head 120, preferably within a recessed portion 125 of the sealing head 120 such that an electromagnetic flux 148 (FIG. 5b) produced by the sealing head 120 is directed toward the top portion 20a.

When the electromagnetic flux passes through the foil liner 23, a current is produced in the foil liner 23 causing it to heat. The heating of the foil liner 23 causes the plastic material of the container lip 24 to heat and melt such that the container lip 24 fuses with the foil liner 23. When the plastic material of the container lip 24 cools, the container 20 is sealed, for example, leak proof sealed, hermetically sealed, tamper evident sealed, or tamper-proof sealed, whichever is preferred. The container 20 can be hermetically sealed by any of the known methods. If the wax compound 22 and paperboard portion 22a are used, the wax compound 22 also heats and melts in response to the heated foil liner 23, thereby releasing the foil liner 23 from the paperboard portion 22a.

Referring now to FIG. 4a, the sealing head 120 includes a coil heatsink 122 having fins 123 extending upwards and away from heat generating portions of the sealing head 120 which will be described in more detail below. Further, the sealing head 120 includes a frame 124, preferably plastic, coupled to the heatsink 122.

Disposed within the frame 124 are a ferrite core 126 (preferably formed of individual cores 126a, 126b, 126c) and a litz wire coil 128 disposed adjacent to the ferrite core 126. As will be described in more detail below, the litz wire coil 128 is disposed around or proximate to the ferrite core 126 to channel the electromagnetic field and direct the field flux 148 (FIG. 5b) towards the foil liner 23 for proper performance. The litz wire 128 is coiled around the ferrite core 126 such that the electromagnetic field developed around the litz wire 128 is channeled into the ferrite core 126.

As shown in FIGS. 3 and 4a, the ferrite core 126 is adapted to provide a tunnel or a U-shaped recess 125 to receive the container 20. In particular, the ferrite core 126 provides a substantially horizontally directed portion 140, two oppositely disposed and substantially vertically directed portions 142 extending from respective edges of the horizontal portion 140, and a center spine portion 126c extending substantially vertically from the horizontal portion 140 but between the oppositely disposed vertical portions 142.

Figure 4B:
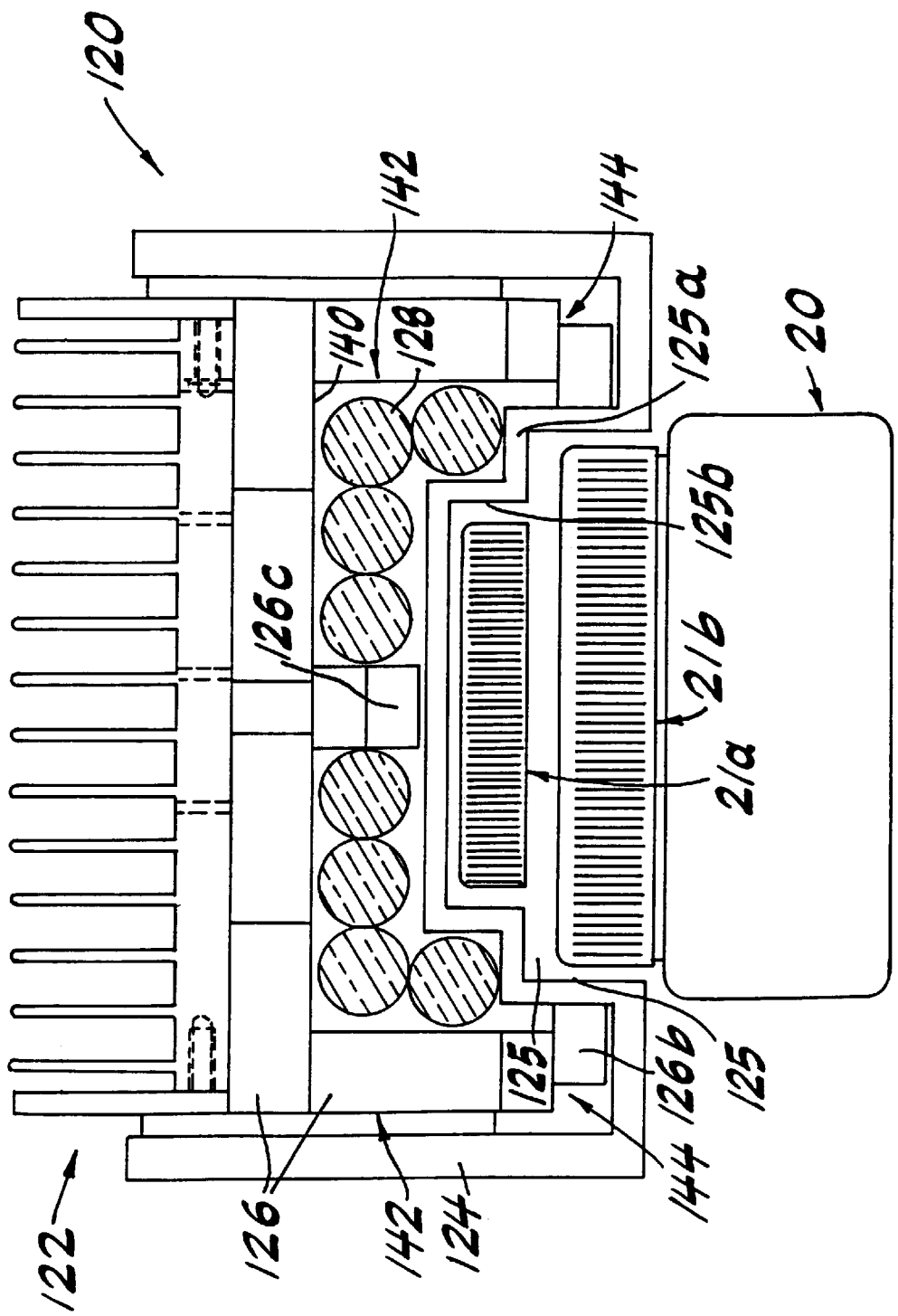
FIG. 4b is an alternative embodiment of a side elevational view of a sealing head employed in the induction sealing unit of FIG. 2, in proximity to a container to be sealed, which embodies certain properties of the present invention.

Referring now to FIG. 4b, it has been found that containers 20 having smaller caps, not shown, receive an improved amount of flux when permitted to move into a second opening portion 125b and attain closer proximity to the center spine portion 126c.

It has also been found that employing inwardly directed cores 126b (FIG. 4a) from the lower edges 144 of the oppositely disposed vertical portions 142 direct the flux toward the container 20 in such a way as to improve the heating of the foil liner 23.

Figure 5A:
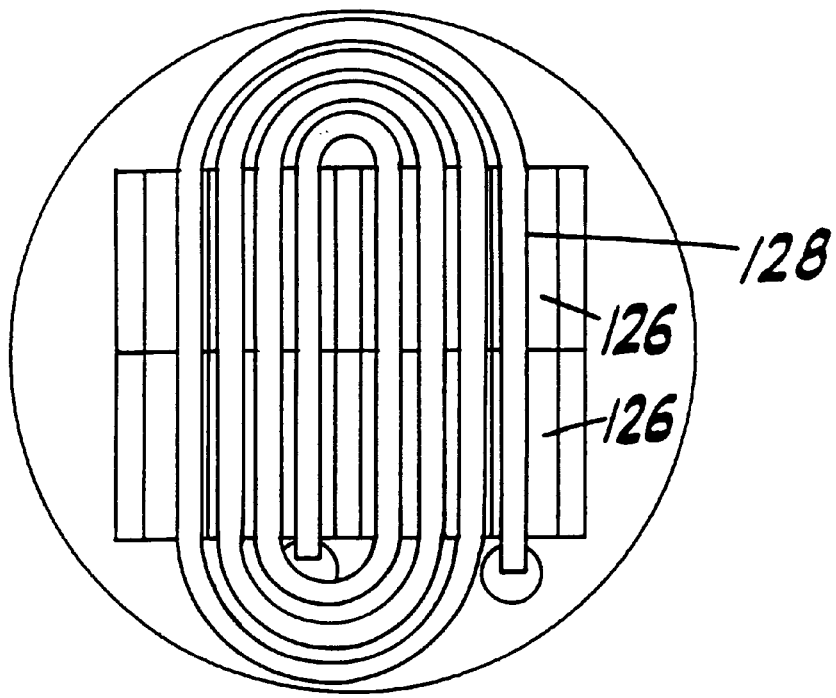
FIG. 5a is a bottom plan view of the coil and ferrite core of the sealing head of FIG. 3.
Figure 5B:
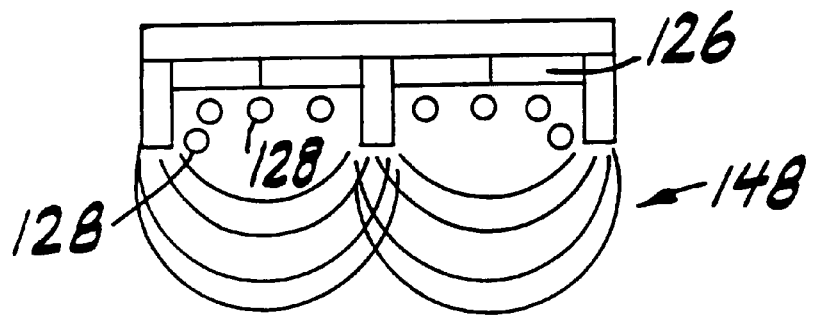
FIG. 5b is a side elevational view of FIG. 4a which includes a schematic representation of the flux lines of an electromagnetic field produced by the coil and ferrite core of the sealing head.

Referring now to FIG. 5a, the litz wire coil 128 is disposed around the ferrite core 126 to channel the electromagnetic field and direct the field flux 148 (FIG. 5b) towards the foil liner 23 for proper performance. The litz wire 128 is coiled around the ferrite core 126 such that the electromagnetic field developed around the litz wire 128 is channeled into the ferrite core 126. The positioning and shape of the ferrite core 126 within the frame 124 directs the electromagnetic field to propagate near an end of the container 20 to be sealed (FIGS. 4a and 4b).

Figure 6:
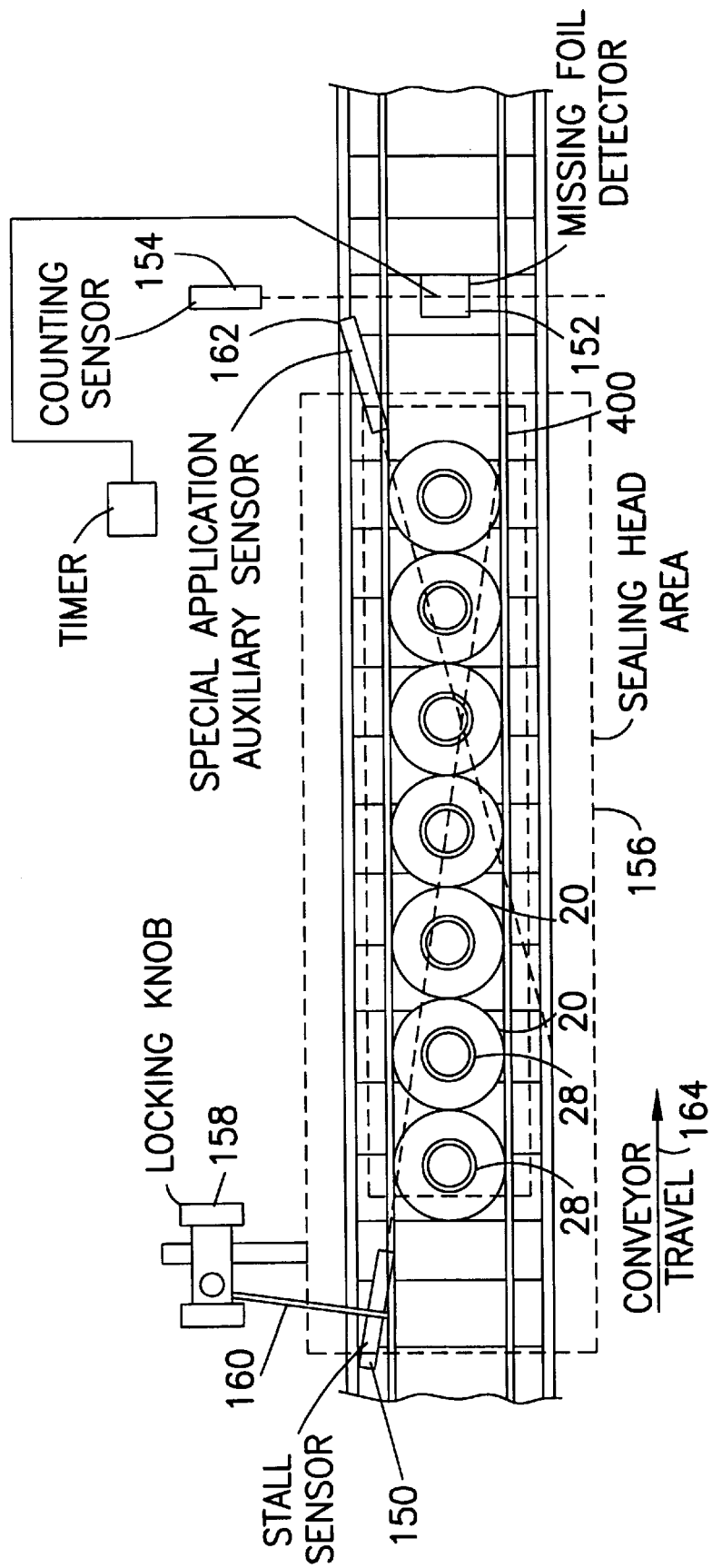
FIG. 6 is a plan elevational view embodying certain principles of the present invention of the induction sealing conveyor system of FIG. 1 in the area of the induction sealing head.

Referring to FIGS. 2 and 6, in accordance with the present invention, the sealing head 100 may include a stall sensor 150 for detecting whether movement of the containers 20 along the conveyor 400 has stalled. The sealing head 100 of FIG. 2 also includes a missing foil detector 152 and a container counting sensor 154.

Advantageously, the stall sensor 150 is a photoeye, i.e., a photoelectric sensor, as is the container counting sensor 154. The missing foil detector 152 is an inductive proximity switch which senses the presence of metal. The photoeyes constituting the sensors 150 and 154 may be of the type available from Efector of Germany, Model No. OFT-FNKG-US-100, and the induction proximity switch constituting the missing foil detector 152 may be of the type available from Turk, Model No. N125U-CK40-AN4X2-H1141.

The stall sensor 150 is adjusted to "see" diagonally under the sealing head 120 by a knob 158 which adjusts the position of mounting brackets 160 for the stall sensor 150 thereby allowing stall sensor 150 to monitor a length along sealing head area 156.

In situations where the containers 20 are relatively small, or if for some reason there are gaps in the procession of containers 20 through the sealing head area 156, it may be necessary to expand the field of view of the stall sensor 150 by providing an auxiliary sensor 162 which may also be a photoeye or photoelectric sensor available from Efector of Germany. Advantageously, the auxiliary sensor 162 is located at an opposite end of the sealing head area 156 to the end in which the stall sensor 150 is located. More specifically, the stall sensor 150 is preferably located at the upstream end of the direction of conveyor travel (as shown by the arrow 164) through the sealing head area 156, while the auxiliary sensor 162 is located at the downstream end.

The container counting sensor 154 is adjusted to see only the side of a container 20 as the container passes.

Figure 7:
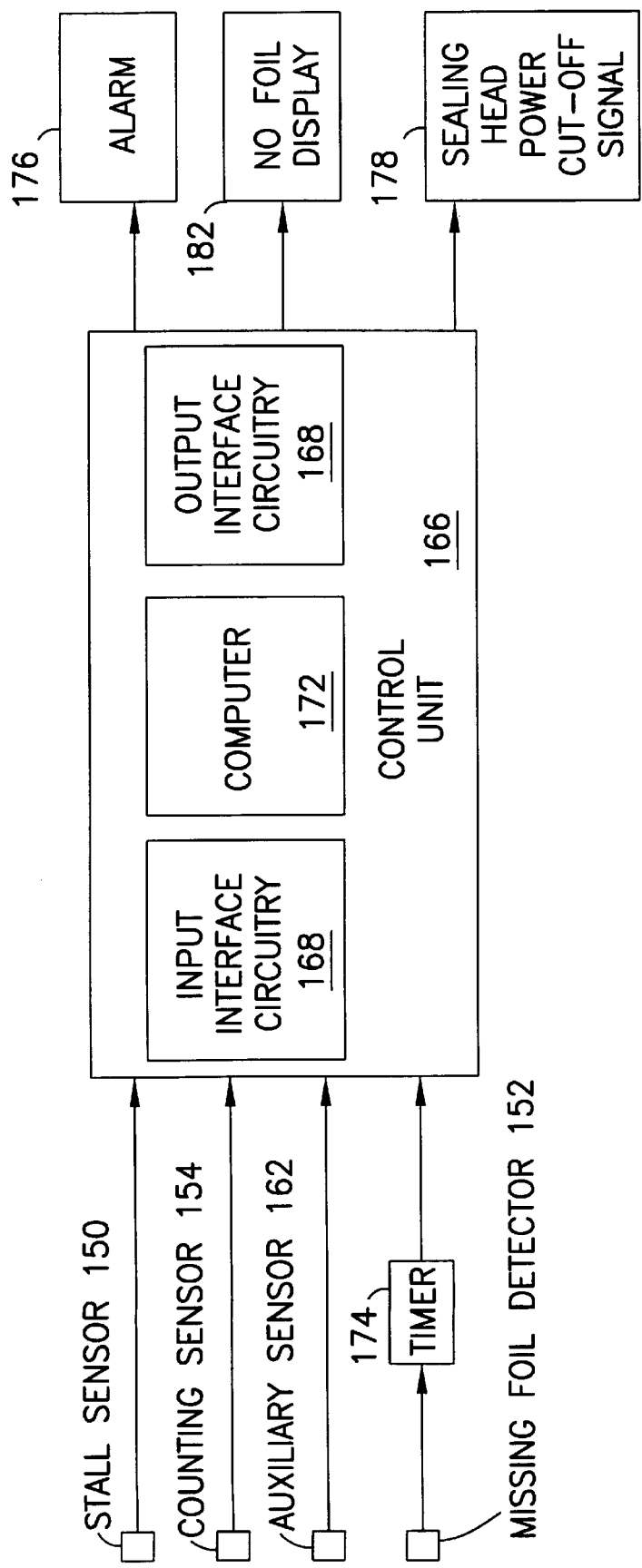
FIG. 7 is a schematic of a circuit for determining whether a stall condition exists and whether a container to be sealed is missing a foil.

Referring to FIG. 7, the stall sensor 150, the missing foil detector 152, the container counting sensor 154 and the auxiliary sensor 162 are connected to a control unit 166 which includes input and output interface circuitry 168 and 170, respectively, as well as a computer 172, which may be a Hitachi Minicomputer Model No. HD647180X0CP6.

Advantageously, the foil detector 152 is connected to the control unit 166 through a timer 174 for purposes that will be explained below.

In operation, a procession of containers 20 is advanced through the sealing head area 156 in the direction shown by the arrow 164. As the respective top portions 28 of the containers 20 are brought into proximity with the sealing head 120, electromagnetic flux produced by the sealing head 120 causes heating of the foil liner 23 of each container 20, thereby causing the containers 20 to be sealed.

The presence of containers 20 under the sealing head 120 is sensed by the stall sensor 150. At the same time, the container counting sensor 154 senses whether containers 20 are moving past the location of the container counting sensor 154.

Movement of containers 20 going past the container counting sensor 154 indicates that there is no stalling of the conveyor 400 or jamming or stalling of the containers 20. If, however, the container counting sensor 154 does not sense any containers 20 going past it, then two conditions may exist.

The first is that there are no more containers 20 on the conveyor 400. This situation would be indicated by a signal from the stall sensor 150 indicating that no containers 20 have been sensed within its field of view. Since there is no container 20 under the sealing head 120, there is no risk of any overheating. Accordingly, no action is necessary. If, however, the container counting sensor 154 does not detect any containers going past it, but the stall sensor 150 detects the presence of containers 20 under the sealing head 120, an overheating condition is possible which could lead to melting, scorching or burning of the tops 28 of the containers 20, damage the product within the containers 20, or cause a fire. Accordingly, when this condition is sensed by the control unit 166, the control unit 166 activates an appropriate alarm 176 or alarms, i.e., a light and/or an audible alarm, and also sends a disconnect signal 178 to cut-off power to the sealing head 120.

The purpose of the missing foil detector 152 is to detect whether each container 20 that goes by the location of the missing foil detector 152 has a foil liner 23. The control unit 166, when it receives a signal from the container counting sensor 154, looks to see whether a signal has also been received from the missing foil detector 152 to verify that the container 20 being counted has a foil 23. If the container counting sensor 154 indicates that a container 20 has moved past the missing foil detector 152, but a signal has not been received from the missing foil detector 152 indicating the presence of a foil 23 in the container 20, then the control unit 166 outputs a signal to a display 180 indicating a missing foil fault.

The purpose of the timer 174 is that some containers 20 may require that the foil signal outputted by the missing foil detector 152 remain on for an extended length of time. The timer 174 extends the length of time that the missing foil signal 15 is on to allow containers 20 to pass without creating a missing foil fault.

A typical sequence of operation is as follows:

1. The stall sensor 150 sees a container 20 under the sealing head 120.

2. The computer 172 receives a stall signal and waits for the stall time to elapse. If a container 20 reaches the counting sensor 154 before the stall time expires, then containers 20 are moving and there is no stall. (Typically, the stall time is set to a minimum time plus 0.2 sec. depending on conveyor speed to reach the counting sensor 154).

3. The containers 20 reach the missing foil detector 152 and the foil signal goes to the computer 172 which starts the foil timer 174.

4. The counting sensor 154 sees the side of a container 20 and sends a signal to the computer 172.

5. The counting sensor signal goes off.

6. The foil signal goes off.

If the computer 172 sees the container counting sensor 154 signal going on and off, it knows the containers 20 are moving. If, however, the stall sensor 150 sees containers 20 and the container counting sensor 154 signal is not changing, then the containers 20 are not moving and must be stalled under the sealing head 120. The sealing head 120 is then shut off and a fault is displayed.

It is to be understood that in the foregoing description any reference to action taken upon a container 20 being sensed by the stall sensor 154, also includes the same action being taken if a container 20 is sensed by the auxiliary sensor 162 where such an auxiliary sensor is used. It is to be still further understood, however, that use of the auxiliary sensor 162 is optional.

The foregoing description of the preferred embodiment of the invention has been presented for the purposes of illustration and description. It is not intended to be exhaustive or to limit the invention to the precise form disclosed. Many modifications and variations are possible in light of the above teaching.

What is claimed is:

1. Apparatus for determining whether a procession of moving articles has stalled, which apparatus comprises:

first sensing means monitoring a plurality of locations along a path of travel of the articles to sense the presence of at least one of the articles at a first location;

b) second sensing means for sensing whether articles are moving past a second location along the path; and c) determining means to determine when the first sensing means senses the presence of at least one article at the first location and the second sensing means senses that articles are not moving past the second location.

2. The apparatus of claim 1, wherein the first sensing means includes a photoeye.

3. The apparatus of claim 1, wherein the second sensing means includes a photoeye.

4. An apparatus for determining whether the movement of articles traveling on a conveyor past a sealing unit of an induction sealing apparatus has stalled, which apparatus comprises:

a) first sensing means monitoring a plurality of locations along the conveyer to sense the presence of at least one of the articles at a first location;

b) second sensing means for sensing whether articles are moving past a second location along the conveyor; and c) means to determine when the first sensing means senses the presence of at least one article at the first location and the second sensing means senses that articles are not moving past the second location.

5. The apparatus of claim 4, wherein the first sensing means includes a first photoeye.

6. The apparatus of claim 4, wherein the first sensing means includes a first photoeye located at one end of a sealing area under the sealing unit and a second photoeye located at an opposite end of the sealing area.

7. The apparatus of claim 6, wherein the second sensing means includes a third photoeye arranged to sense the presence of a side of an article passing thereby.

8. An apparatus for determining whether the movement of articles traveling on a conveyor past a sealing unit of induction sealing apparatus has stalled, which apparatus comprises:
   a) first sensing means for sensing the presence of at least one of the articles at a first location along the conveyor;
   b) second sensing means for sensing whether articles are moving past another location along the conveyor;
   c) means responsive to the first sensing means sensing the presence of at least one article at the first location and responsive to the second sensing means sensing that articles are not moving past the second location for determining that the movement of articles along the conveyor has stalled; and
   d) third sensing means for sensing whether each article after a sealing operation has a foil sealed thereto.

9. The apparatus of claim 8, wherein the third sensing means is located at the second location along the conveyor, and the determining means in response to the second sensing means sensing that an article is moving past the second location and the third sensing means not sensing the presence of a foil in such article outputs a missing foil signal.

10. The apparatus of claim 9, wherein the first sensing means includes a first photoeye located at one end of a sealing area under the sealing unit and a second photoeye located at an opposite end of the sealing area, and the second sensing means includes a third photoeye arranged to sense the presence of a side of an article passing thereby.

11. The apparatus of claim 10, wherein the second location is a location downstream relative to a direction of travel of the conveyor of the sealing unit.

12. Apparatus for determining whether a procession of moving articles has stalled, which apparatus comprises:
   a) a first photoelectric device monitoring a plurality of locations along a path of travel of the articles to sense the presence of at least one of the articles at a first location;
   b) a second photoelectric device to sense whether articles are moving past a second location along the path; and
   c) a control unit to determine when the first photoelectric device senses the presence of at least one article at the first location and the second photoelectric device senses that articles are not moving past the second location.

13. The apparatus of claim 12, wherein the control unit includes a computer.

14. A method of determining whether a procession of moving articles has stalled, which method comprises the steps of:
   a) monitoring a plurality of locations along a path of travel of the articles to sense the presence of at least one of the articles at a first location;
   b) sensing whether articles are moving past another location along the path; and
   c) determining that the movement of articles has stalled if at least one article is sensed at the first location and articles are not moving past the second location.

15. The method of claim 14, wherein step (a) includes photoelectric sensing.

16. The method of claim 14, wherein step (b) includes photoelectric sensing.

17. A method of determining whether the movement of articles traveling on a conveyor past a sealing unit of induction sealing apparatus has stalled, which method comprises the steps of:
   a) monitoring a plurality of locations along the conveyors to sense the presence of at least one of the articles at a first location;
   b) sensing whether articles are moving past a second location along the conveyor; and
   c) determining that the movement of articles along the conveyor has stalled if the presence of at least one article is sensed at the first location and articles are not moving past the second location.

18. The method of claim 15, wherein step (a) includes photoelectric sensing.

19. The method of claim 16, wherein step (a) includes photoelectric sensing.

20. The method of claim 17, further including the step of activating an alarm if step (c) determines that the movement of articles has stalled.

21. The method of claim 17, further including the step of shutting off the induction sealing unit if step (c) determines that the movement of articles has stalled.

22. The method of claim 17, which, if step (c) determines that the movement of articles has stalled, further includes the steps of activating an alarm and shutting off power to the induction sealing unit.

23. Apparatus for determining whether a procession of moving articles has stalled, which apparatus comprises:
   a) a first sensor monitoring a plurality of locations along a path of travel of the articles to sense the presence of at least one of the articles at a first location;
   b) a second sensor to sense whether articles are moving past a second location along the path; and
   c) a control unit to determine when the first sensor senses the presence of at least one article at the first location and the second sensor senses that articles are not moving past the second location.

24. The apparatus of claim 1, wherein the determining means determines that the movement of articles has stalled if the first sensing means senses the presence of at least one article at the first location and the second sensing means senses that articles are not moving past the second location.

25. The apparatus of claim 4, wherein the determining means determines that the movement of articles has stalled if the first sensing means senses the presence of at least one article at the first location and the second sensing means senses that articles are not moving past the second location.

26. The apparatus of claim 12, wherein the control unit determines that the movement of articles has stalled if the first photoelectric device senses the presence of at least one article at the first location and the second photoelectric device senses that articles are not moving past the second location.

27. The apparatus of claim 23, wherein the control unit determines that the movement of articles has stalled if the first sensor senses the presence of at least one article at the first location and the second sensor senses that articles are not moving past the second location.

* * * * *